US012455098B2

United States Patent
Vasudevan et al.

(10) Patent No.: US 12,455,098 B2
(45) Date of Patent: Oct. 28, 2025

(54) THERMAL EFFICIENCY SYSTEM AND METHOD FOR BOILER PLANT

(71) Applicant: The Cleaver-Brooks Company, Inc., Thomasville, GA (US)

(72) Inventors: Meenatchinathan Vasudevan, Lincoln, NE (US); Dillon Gushard, Lincoln, NE (US)

(73) Assignee: The Cleaver-Brooks Company, Inc., Thomasville, GA (US)

( * ) Notice: Subject to any disclaimer, the term of this patent is extended or adjusted under 35 U.S.C. 154(b) by 391 days.

(21) Appl. No.: 18/133,341

(22) Filed: Apr. 11, 2023

(65) Prior Publication Data

US 2023/0324079 A1 Oct. 12, 2023

Related U.S. Application Data

(60) Provisional application No. 63/330,137, filed on Apr. 12, 2022.

(51) Int. Cl.
 *F24H 15/156* (2022.01)
 *G05B 15/02* (2006.01)

(52) U.S. Cl.
 CPC ........... *F24H 15/156* (2022.01); *G05B 15/02* (2013.01)

(58) Field of Classification Search
 CPC ....... F24H 15/156; G05B 15/02; G05B 11/00; G05B 19/00; G05B 15/00
 See application file for complete search history.

(56) References Cited

U.S. PATENT DOCUMENTS

| | | | |
|---|---|---|---|
| 4,101,265 A | 7/1978 | Broach et al. | |
| 4,137,965 A | 2/1979 | Fallon et al. | |
| 4,216,903 A | 8/1980 | Giuffre | |
| 4,268,869 A | 5/1981 | Heyer et al. | |
| 4,392,610 A * | 7/1983 | Moskal | F28D 21/0003 237/55 |
| 5,730,356 A | 3/1998 | Mongan | |

(Continued)

FOREIGN PATENT DOCUMENTS

| | | |
|---|---|---|
| CN | 102183086 | 12/2013 |
| CN | 105258518 | 1/2016 |

(Continued)

OTHER PUBLICATIONS

Industrial Waste Heat Recovery Systems, Sigma Thermal, https://www.sigmathermal.com/products/waste-heat-recovery/, (8 pages).

(Continued)

*Primary Examiner* — Kidest Bahta

(57) ABSTRACT

Thermal efficiency systems and methods are provided for installation and use in boiler plants. Thermal efficiency systems include a reservoir, a plurality of heat scavengers, a plurality of heat sinks, and a control system. Each heat scavenger can receive system fluid, extract excess heat from a heated plant fluid, and provide the extracted heat into the system fluid to create heated system fluid. Each heat sink can receive and remove heat from heated system fluid to create cooled system fluid. The controller generates and sends control signals to selectively activate one or more of a plurality of valves to control amount of system fluid directed to each heat scavenger and each heat sink.

20 Claims, 7 Drawing Sheets

(56) References Cited

U.S. PATENT DOCUMENTS

| | | | |
|---|---|---|---|
| 7,237,383 B2 | 7/2007 | Ahrens-Botzong | |
| 7,658,335 B2 | 2/2010 | Johnson, Jr. et al. | |
| 8,590,307 B2 | 11/2013 | Kopecek et al. | |
| 9,574,829 B2 | 2/2017 | Yang et al. | |
| 9,803,853 B2 | 10/2017 | Nakashoji et al. | |
| 9,863,646 B2 | 1/2018 | Johnson et al. | |
| 10,041,744 B2 | 8/2018 | Park | |
| 10,823,015 B2 | 11/2020 | Fu et al. | |
| 2017/0227299 A1* | 8/2017 | Eustis | F25B 30/02 |
| 2018/0245800 A1* | 8/2018 | Darko | F24D 17/0036 |
| 2018/0320986 A1* | 11/2018 | Frazier | F28D 20/026 |
| 2020/0147570 A1* | 5/2020 | Kong | C01B 3/48 |

FOREIGN PATENT DOCUMENTS

| | | |
|---|---|---|
| CN | 205842823 | 6/2016 |
| CN | 107388869 | 11/2017 |
| CN | 105180144 | 3/2018 |
| CN | 110030861 | 7/2019 |
| CN | 111256156 | 1/2020 |
| EP | 0814306 | 2/2003 |
| EP | 1607687 | 12/2005 |
| EP | 2484983 | 9/2017 |
| EP | 3677864 | 8/2020 |
| IT | 1256878 | 7/1992 |
| WO | 2012114944 | 8/2012 |
| WO | 2020185154 | 9/2020 |

OTHER PUBLICATIONS

Daniel Skiles_Improve the Performance of Your Boiler System; Oct. 2014; American Institute of Chemical Engineers; pp. 31-35.
Heat Recovery; http://www.deltathx.com/product/heat-recovery/, (7 pages).
Waste Heat Recovery Units Exhaust Exchanger, https://www.petrotechheaters.com/industrial-process-heaters-furnances/waste-heat-recovery-units/, (3 pages).

* cited by examiner

THERMAL EFFICIENCY SYSTEM AND METHOD FOR BOILER PLANT

CROSS-REFERENCE TO RELATED APPLICATIONS

This application claims priority to, and the benefit of, U.S. Provisional Patent application Ser. No. 63/330,137, entitled "Thermal Efficiency System and Method for Boiler Plant," filed on Apr. 12, 2022, the contents of which are hereby incorporated by reference in their entirety.

FIELD OF THE INVENTION

The present technology relates to systems and methods for recovering and redistributing waste heat within a boiler plant to increase thermal efficiency.

BACKGROUND

In a typical boiler plant, it is estimated that about 14% to 20% of the heating value of the fuel burned is wasted to the atmosphere through the hot flue gases exiting the stacks (i.e., stack heat). In addition, typical boiler plants use supplemental heat from external heat sources to preheat process fluids such as make up water, condensate return water, combustion air and for service needs (e.g., building heat and hot water needs).

Conventional solutions focus on improving thermal efficiencies of individual boilers, and efficiency gains depend upon the operating conditions of the given boiler.

SUMMARY OF THE INVENTION

Thermal efficiency systems and methods of operating thermal efficiency systems are provided herein.

In at least one aspect, a thermal efficiency system for use in a boiler plant includes a reservoir, a plurality of heat scavengers, a plurality of heat sinks, and a control system. The reservoir stores system fluid, and has an inlet and an outlet. Each heat scavenger is configured to receive a first portion of system fluid from the reservoir outlet, extract an amount of excess heat from a first portion of heated plant fluid, and provide the extracted amount of heat into the first portion of system fluid to create a first portion of heated system fluid. Each heat sink is configured to receive and remove an amount heat from a second portion of heated system fluid to create a first portion of cooled system fluid. The control system includes a controller, a plurality of sensors, and a plurality of valves. The controller receives at least one sensed parameter signal from at least one of the plurality of sensors, and sends at least one control signal to selectively activate one or more of the plurality of valves to control the amount of excess heat extracted by each of the plurality of heat scavengers and direct each second portion of heated system fluid to a heat sink.

In some examples, the system may also include a piping system that conveys each first portion of system fluid to each heat scavenger, combines one or more of the first portions of heated system fluid to create each second portion of heated system fluid, conveys each second portion of heated system fluid to a heat sink, combines one or more of the first portions of cooled system fluid to create at least one second portion of cooled system fluid, and conveys the at least one second portion of cooled system fluid to the reservoir inlet.

In at least a second aspect, a method of operating a thermal efficiency system in a boiler plant is provided. The method includes providing a control system including a controller, a plurality of sensors, and a plurality of valves. The method also includes receiving by the controller at least one sensed parameter signal from at least one of the plurality of sensors, and receiving by the controller a data input signal from a user interface, the data input signal including at least one set point providing a temperature limit for at least one plant fluid. The method further includes generating by the controller at least a first control signal based at least in part on the at least one sensed parameter signal and the at least one set point, and selectively activating by the first control signal a first scavenger inlet valve to direct a first portion of system fluid to a first heat scavenger, wherein the heat scavenger extracts an amount of excess heat from a first portion of heated plant fluid, and provides the extracted amount of heat into the first portion of system fluid to create a first portion of heated system fluid. The method may also include generating by the controller at least a second control signal based at least in part on the at least one sensed parameter signal and the at least one set point, and selectively activating by the second control signal a first heat sink inlet valve to direct a second portion of heated system fluid to a first heat sink.

In at least a third aspect, a thermal efficiency system is provided that includes a reservoir, a plurality of heat scavengers, a plurality of heat sinks, and a control system. The reservoir that stores system fluid and has an inlet and an outlet. Each heat sink is configured to receive and remove an amount of heat from a first portion of heated system fluid to create a first portion of cooled system fluid. Each heat scavenger is configured to receive a second portion of cooled system fluid, extract an amount of excess heat from a portion of heated plant fluid, and provide the extracted amount of heat into the second portion of cooled system fluid to create a second portion of heated system fluid. The control system including a controller, a plurality of sensors, and a plurality of valves. The controller receives at least one sensed parameter signal from at least one of the plurality of sensors, and sends at least one control signal to selectively activate one or more of the plurality of valves to control flow of the system fluid.

In at least a fourth aspect, a method of operating a thermal efficiency system in a boiler plant is provided. The method includes providing a control system including a controller, a plurality of sensors, and a plurality of valves. The method also includes receiving by the controller at least one sensed parameter signal from at least one of the plurality of sensors, and receiving by the controller a data input signal from a user interface, the data input signal including at least one set point providing a temperature limit for at least one plant fluid. The method further includes generating by the controller at least a first control signal based at least in part on the at least one sensed parameter signal and the at least one set point, and selectively activating by the first control signal a first heat sink inlet valve to direct a first portion of system fluid to a first heat sink, wherein the first heat sink extracts an amount of excess heat from a first portion of heated system fluid, and provides the extracted amount of heat into the first portion of process fluid to create a first portion of cooled system fluid. The method may also include generating by the controller at least a second control signal based at least in part on the at least one sensed parameter signal and the at least one set point, and selectively activating by the second control signal a first heat scavenger inlet valve to direct a second portion of cooled system fluid to a first heat scavenger.

In any of the aspects and examples described above, the system fluid may be deaerated water. Additionally, or alternatively, the plant fluid, or second portion of plant fluid, may be a service fluid.

In any of the aspects and examples described above, the plurality of heat sinks may include at least a first heat sink that provides the amount of removed heat to a process fluid, and at least a second heat sink that provides the amount of removed heat to a system fluid.

In any of the aspects and examples described above, the plurality of sensors may include at least two or more sensors selected form the group consisting of: an ambient temperature sensor, an ambient humidity sensor, a system fluid temperature sensor, a system fluid flow meter, a cooled plant fluid temperature sensor, a heated plant fluid temperature sensor, and a cooled system fluid temperature sensor. In some such examples, the plurality of sensors may include an ambient temperature sensor, an ambient humidity sensor, a system fluid temperature sensor, and a system fluid flow meter. Additionally or alternatively, the plurality of sensors may include at least one cooled plant fluid temperature sensor that measures a temperature of cooled plant fluid from each heat scavenger. Additionally or alternatively, the plurality of sensors may include at least one heated plant fluid temperature sensor that measures a temperature of heated plant fluid from each heat sink.

In any of the aspects and examples described above, the system may also include at least one user interface that sends an input data signal to the controller, wherein the input data signal includes at least one set point providing a temperature limit for at least one plant fluid, and the controller generates the at least one control signal based in part on the at least one set point. In some such examples, the at least one set point may include: a lower temperature limit for a cooled plant fluid, a lower temperature limit for a heated plant fluid, and/or an upper temperature limit for a heated plant fluid.

In any of the aspects and examples described above, the controller may send a first control signal to a first scavenger inlet valve to selectively open or close the first scavenger inlet valve and a second control signal to a first heat sink inlet valve to selectively open or close the first heat sink inlet valve.

In any of the aspects and examples of methods described above, the method may also include calculating by the controller an acid dew point, wherein the step of generating by the controller at least a first control signal is further based at least in part on the calculated acid dew point.

BRIEF DESCRIPTION OF THE DRAWINGS

Specific examples have been chosen for purposes of illustration and description, and are shown in the accompanying drawings, forming a part of the specification.

Figure 1:
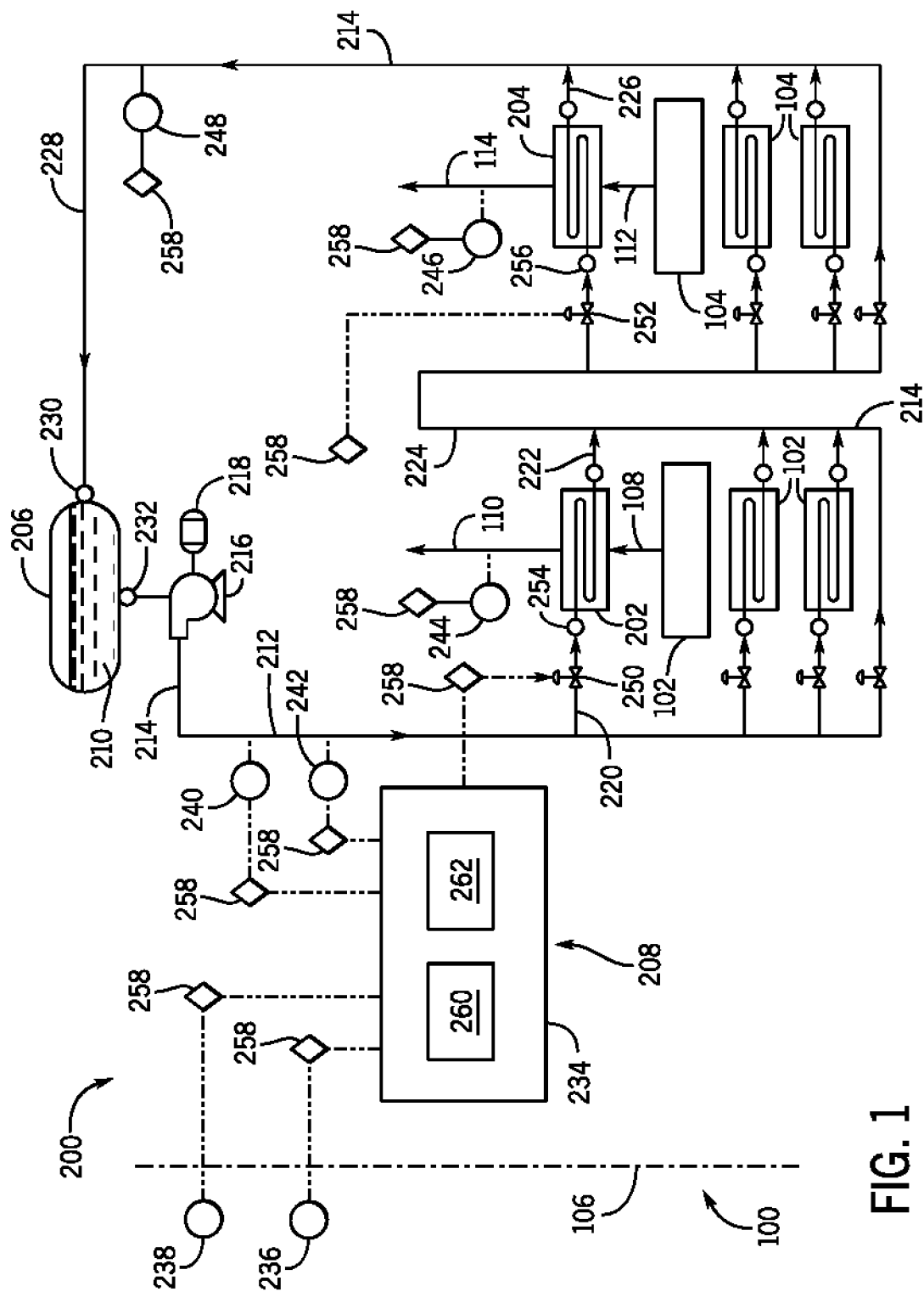
FIG. 1 illustrates one example of a thermal efficiency system of the present technology installed in a first plant.

While various embodiments discussed herein are amenable to modifications and alternative forms, aspects thereof have been shown by way of example in the drawings and are described in detail herein. It should be understood, however, that the disclosure is not limited to the particular embodiments described, and instead is meant to include all modifications, equivalents, and alternatives falling within the scope of the disclosure. In addition, the terms "example" and "embodiment" as used throughout this application is only by way of illustration, and not limitation, the Figures are not necessarily drawn to scale, and the use of the same reference symbols in different drawings indicates similar or identical items unless otherwise noted.

DETAILED DESCRIPTION

Thermal efficiency systems and methods of operating such systems are provided herein. Thermal efficiency systems of the present technology are suited for installation and use in industrial process plants, and particularly in boiler plants. Generally, a boiler plant will utilize one or more plant fluids, which may include process fluids used in plant processes and service fluids used for plant operations. Plant processes usually include one or more heat sources, which may include one or more boilers. Each heat source generates heat that is directed into a process fluid, and may, depending upon operating conditions, generate excess heat, which is sometimes also referred to as waste heat because it is often typically wasted rather than being redirected and used within the boiler plant. Plant processes also usually have one or more process fluids that may require heat input, such as cold process fluids, make up water, and combustion air. Plants may also have one or more service fluids that may require heat input, such as building make up air and service water. Thermal efficiency systems and methods of the present technology are configured to gather and combine excess heat from process fluids using heat scavengers and distribute it to heat sinks throughout the plant as needed to provide heat to process fluids and service fluids.

Thermal efficiency systems of the present technology can include a control system that uses one or more programmable logic controllers (or PLCs or PLC) that implement a control scheme. The control scheme can factor in ambient conditions and control heat recovery and heat utilization with a goal of improving, and preferably optimizing efficiency. In some examples, use of thermal efficiency systems of the present technology may reduce the plant's carbon footprint and greenhouse gas emissions, potentially by from about 4% to about 15%, depending on the ambient conditions and availability of heat sinks. While thermal efficiency systems of the present technology can be designed and installed as part of new boiler plants, in at least some examples, thermal efficiency systems of the present technology may also be retrofitted to preexisting boiler plants.

Figure 2:
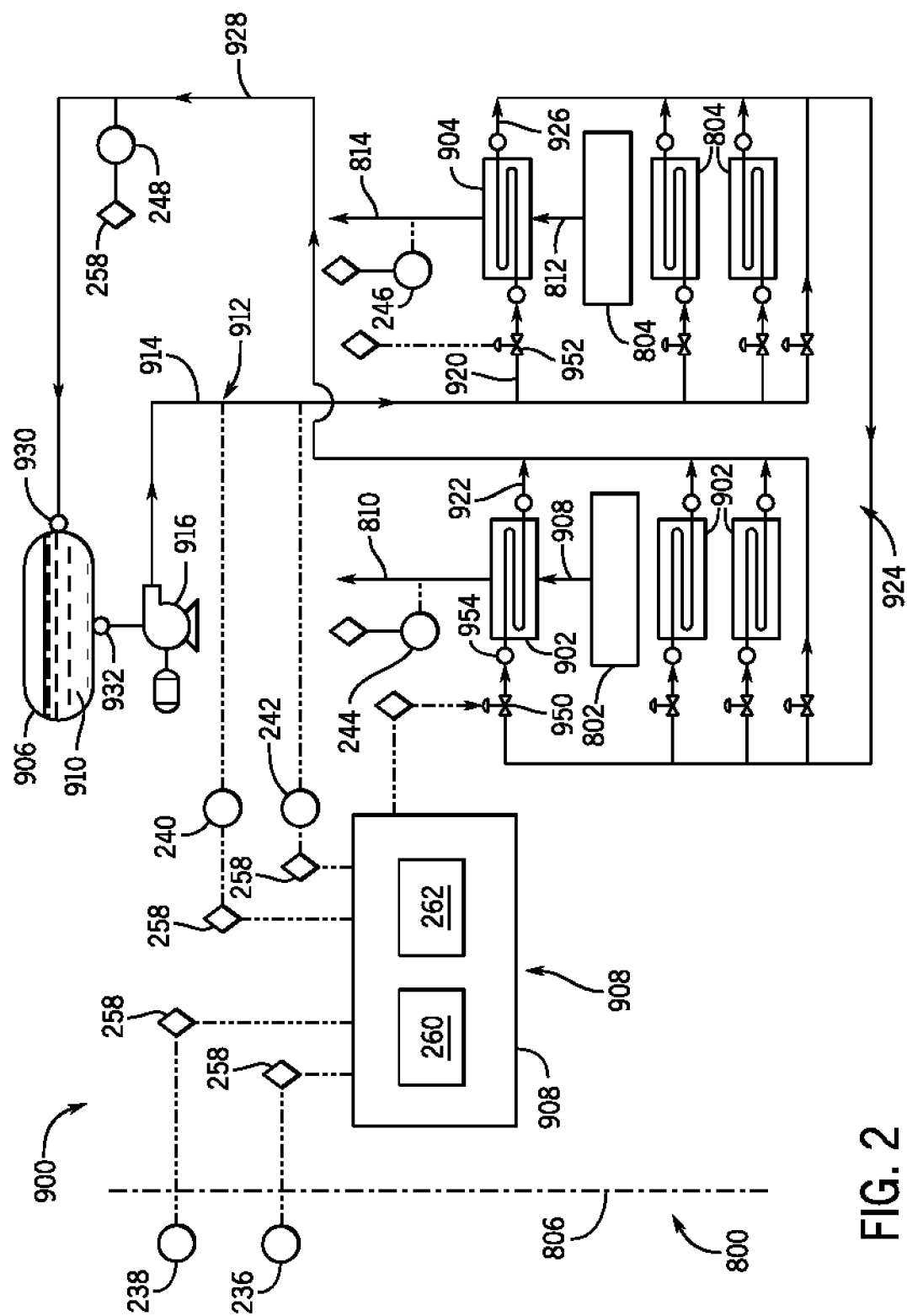
FIG. 2 illustrates a second example of a thermal efficiency system of the present technology installed in a second plant.

FIGS. 1 and 2 illustrate examples of thermal efficiency systems of the present technology. FIG. 1 illustrates one example of a thermal efficiency system 200 of the present technology for use in plant 100, where the temperature of the system fluid in the reservoir is relatively low. In the example of FIG. 1, portions of system fluid can be directed first trough one or more heat scavengers to become heated, and the heated system fluid can then be directed to one or more heat sinks to be cooled. FIG. 2 illustrates one example of a thermal efficiency system 900 of the present technology for use in plant 800, where the temperature of the system fluid in the reservoir is relatively high. In the example of FIG. 2, the system fluid can be directed through one or more heat sinks first to become cooled, and the cooled system fluid can then be directed to one or more heat scavengers to heated.

Referring to the example shown in FIG. 1, the boiler plant 100 includes at least one heat source 102, and at least one cooled plant fluid source 104. The boiler plant 100 can include a plurality of heat sources 102 and a plurality of cooled plant fluid sources 104. While three heat sources 102 and three cooled plant fluid sources 104 are shown in the illustrated example, it should be understood that the boiler plant may include any number of heat sources and any number of cooled plant fluid sources. The boiler plant 100 may also include at least one building having an outside wall 106 that separates the inside of the building from the outside (i.e., ambient) weather conditions.

The thermal efficiency system 200 includes at least one heat scavenger 202, at least one heat sink 204, at least one reservoir 206, and a control system 208. The thermal efficiency system 200 includes a system fluid 210 and a fluid transport system 212 that creates a fluid loop that divides the system fluid 210 into portions and transports the portions of system fluid 210 from the reservoir to at least one heat scavenger 202, and then to at least one heat sink 204, and then back to the reservoir 206. The fluid transport system 212 includes a plurality of pipes 214 configured to convey portions of system fluid 210, and at least one pump 216, which can be powered by at least one motor 218.

The thermal efficiency system 200 can include a plurality of heat scavengers 202 and a plurality of heat sinks 204. While three heat scavengers 202 and three heat sinks 204 are shown in the illustrated example, it should be understood that the boiler plant may include any number of heat scavengers and any number of heat sinks. The boiler plant may include one heat scavenger for each heat source and one heat sink for each cooled plant fluid source.

Each heat scavenger 202 may be operatively connected to a heat source 102 such that the heat scavenger receives first heated process fluid 108 from the heat source 102. The at least one pump 216 can pump at least a first portion of system fluid 220 from the reservoir 206 through the reservoir outlet 232 to one of the heat scavengers 202. Each heat scavenger 202 may be a heat exchanger configured to extract an amount of excess heat from the first heated process fluid 108 to create first cooled process fluid 110. The heat scavenger 202 can provide the extracted amount of heat into a first portion of system fluid 220 to create a first portion of heated system fluid 222.

Between each heat scavenger 202 and each heat sink 204, the plurality of pipes 214 of the fluid transport system 212 can be configured to combine one or more of the first portions of heated system fluid 222 to create at least one second portion of heated system fluid 224. The plurality of pipes 214 of the fluid transport system 212 may be configured to combine each of the first portions of heated system fluid 222 to create a single combined second portion of heated system fluid 224. The control system 208 may control any combining of the first portions of heated system fluid 222, directs each second portion of heated system fluid 224 to a heat sink 204.

Each heat sink 204 may be operatively connected to a cooled plant fluid source 104 such that the heat sink 204 receives second cooled plant fluid 112 from the cooled plant fluid source 104. Each heat sink 204 may be a heat exchanger configured to receive and remove heat from at least one second portion of heated system fluid 224 to create a first portion of cooled system fluid 226. The heat sink 204 can provide the removed amount of heat into the second cooled plant fluid 112 to create a second heated plant fluid 114.

The plurality of pipes 214 of the fluid transport system 212 can be configured to combine one or more of the first portions of cooled system fluid 226 to create at least one second portion of cooled system fluid 228. The plurality of pipes 214 of the fluid transport system 212 may be configured to combine each of the first portions of cooled system fluid 226 to create a single combined second portion of cooled system fluid 228. The control system 208 may control any combining of the first portions of cooled system fluid 226, and direct each second portion of cooled system fluid 228 to the reservoir 206. Each second portion of cooled system fluid 228 enters the reservoir through reservoir inlet 230 and combines to form system fluid 210.

Referring to the example shown in FIG. 2, the boiler plant 800 includes at least one heat source 802, and at least one cooled plant fluid source 804. The boiler plant 800 can include a plurality of heat sources 802 and a plurality of cooled plant fluid sources 804. It should be understood that the boiler plant 800 may include any number of heat sources and any number of cooled plant fluid sources. The boiler plant 800 may also include at least one building having an outside wall 806 that separates the inside of the building from the outside (i.e., ambient) weather conditions.

The thermal efficiency system 900 includes at least one heat scavenger 902, at least one heat sink 904, at least one reservoir 906, and a control system 908. The thermal efficiency system 900 includes a system fluid 910 and a fluid transport system 912 that creates a fluid loop that divides the system fluid 910 into portions and transports the portions of system fluid 910 from the reservoir to at least one heat sink 904, and then to at least one heat scavenger 902, and then back to the reservoir 906. The fluid transport system 912 includes a plurality of pipes 914 configured to convey portions of system fluid 910, and at least one pump 916.

The thermal efficiency system 900 can include a plurality of heat scavengers 902 and a plurality of heat sinks 904. It should be understood that the boiler plant may include any number of heat scavengers and any number of heat sinks. The boiler plant may include one heat scavenger for each heat source and one heat sink for each cooled plant fluid source.

Each heat scavenger 902 may be operatively connected to a heat source 902 such that the heat scavenger receives first heated process fluid 808 from the heat source 802. Each heat scavenger 902 may be a heat exchanger configured to extract an amount of excess heat from the first heated process fluid 808 to create first cooled process fluid 810.

The at least one pump 916 can pump at least a first portion of system fluid 920 from the reservoir 906 through the reservoir outlet 932 to one of the heat sinks 902. Each heat sink 904 may be operatively connected to a cooled plant fluid source 904 such that the heat sink 904 receives second cooled plant fluid 812 from the cooled plant fluid source 804. Each heat sink 904 may be a heat exchanger configured to receive and remove heat from at least one first portion of heated system fluid 920 to create a first portion of cooled system fluid 926. The heat sink 904 can provide the removed amount of heat into the second cooled plant fluid 812 to create a second heated plant fluid 814.

Between each heat sink 904 and each heat scavenger 902, the plurality of pipes 914 of the fluid transport system 912 can be configured to combine one or more of the first portions of cooled system fluid 926 to create at least one second portion of cooled system fluid 924. The plurality of pipes 914 of the fluid transport system 912 may be configured to combine each of the first portions of cooled system fluid 926 to create a single combined second portion of cooled system fluid 924. The control system 908 may control any combining of the first portions of cooled system fluid 926, and direct each second portion of cooled system fluid 924 to a heat scavenger 902.

Each heat scavenger may receive a second portion of cooled system fluid 924 through the scavenger inlet 954. Each heat scavenger 902 can provide the extracted amount of heat from the first heated process fluid 808 into the second portion of cooled system fluid 924 to create a second portion of heated system fluid 922.

The plurality of pipes 914 of the fluid transport system 912 can be configured to combine one or more of the second portions of heated system fluid 922 to create at least one combined second portion of heated system fluid 928. The plurality of pipes 914 of the fluid transport system 912 may be configured to combine each of the second portions of heated system fluid 922 to create a single combined second portion of heated system fluid 928. The control system 908 may control any combining of the second portions of heated system fluid 922, and direct each second combined portion of heated system fluid 928 to the reservoir 906. Each second portion of combined heated system fluid 928 enters the reservoir through reservoir inlet 930 and combines to form system fluid 910.

Referring to FIGS. 1 and 2, the reservoir 206, 906 of the thermal efficiency system 200, 900 may be a pre-existing reservoir within the boiler plant 100, 800 or may be an additional reservoir. In examples where the reservoir is a pre-existing reservoir within the boiler plant 100, where the temperature of the service fluid in the reservoir 206 is relatively low, the reservoir may be a tank that stores a system fluid such as glycol-water mixtures, various heat transfer fluids, condensate return water, or other system fluids. In examples where the reservoir is a pre-existing reservoir within the boiler plant 800, where the temperature of the service fluid in the reservoir 906 is relatively high, the reservoir 906 may be a tank that stores a system fluid such as deaerated water, or other various system fluids. In such examples where the reservoir is a pre-existing reservoir, the reservoir 206 or 906 may have additional inlets and outlets, aside from the reservoir inlet 230, 930 and the reservoir outlet 232, 932, and system fluid from the reservoir may be used for other purposes within the boiler plant. In examples where the reservoir 206, 906 is an additional reservoir, the additional reservoir may be added to the boiler plant 100, 800 when the thermal efficiency system 200, 900 is installed. The additional reservoir may be a dedicated reservoir that is only used as part of the thermal efficiency system, such that the reservoir 206, 906 does not have additional inlets and outlets, aside from the reservoir inlet 230, 930 and the reservoir outlet 232, 932, and the system fluid is not used for other purposes within the boiler plant. In such examples, the system fluid may be any suitable system fluid.

Figure 3:
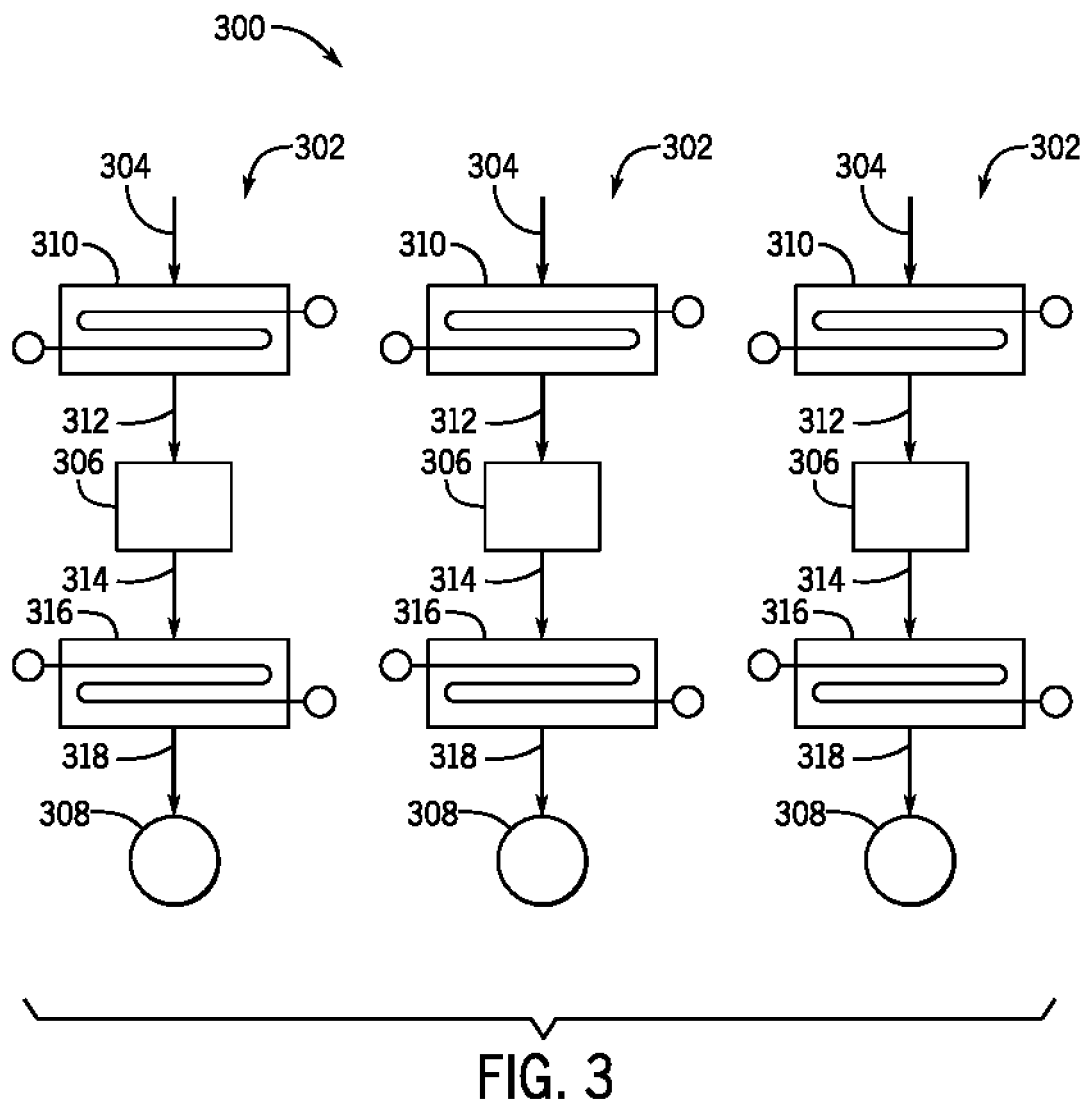
FIG. 3 illustrates some examples of locations for heat scavengers and heat sinks of the thermal efficiency systems of FIG. 1 and FIG. 2 with respect to multiple boilers.
Figure 4:
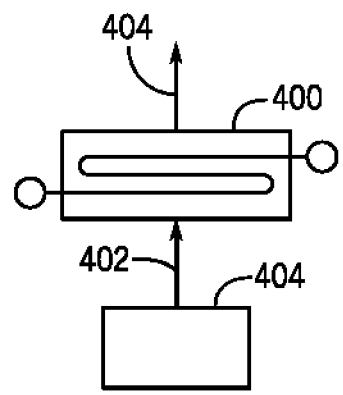
FIG. 4 illustrates a heat sink of the thermal efficiency systems of FIG. 1 and FIG. 2 placed to provide heat to a process fluid.
Figure 5:
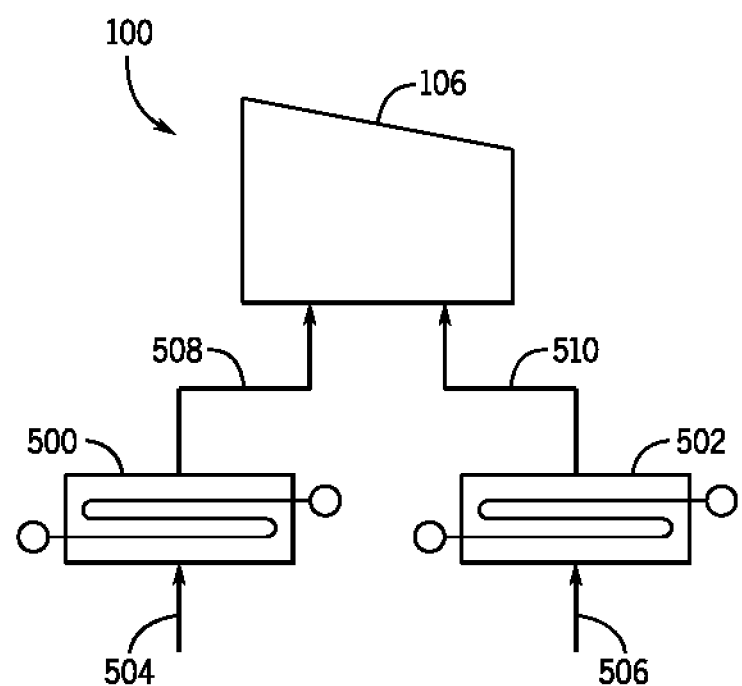
FIG. 5 illustrates some further examples of heat sinks of the thermal efficiency systems of FIG. 1 and FIG. 2.

FIGS. 3-5 illustrate examples of locations that heat scavengers and heat sinks may be placed as part of a thermal efficiency system of the present technology, such as the thermal efficiency system 200 associated with boiler plant 100 or the thermal efficiency system 900 associated with boiler plant 800.

FIG. 3 illustrates a plurality of boiler systems 300 within the boiler plant. In the illustrated example, three boiler systems are shown, but it should be understood that any number of boiler systems could be present, depending upon the configuration of the boiler plant. Each individual boiler system 302 includes combustion air 304, a boiler 306, and a stack 308. Referring to FIGS. 1 and 3, the combustion air 304 of each boiler system is a process fluid that may need to be heated prior to entering the boiler 306, and may thus correspond to a second cooled plant fluid 112 of the boiler plant 100. A heat sink 310 may be placed within each boiler system 302, and each heat sink 310 may correspond to a heat sink 204 of FIG. 1 or a heat sink 904 of FIG. 2. Each heat sink 310 receives and removes heat from heated system fluid, such as at least one second portion of heated system fluid 224, and provides the removed amount of heat into combustion air 302 to create heated combustion air 312, which may correspond to a second heated plant fluid 114. The heated combustion air 312 is provided to the boiler 306 of each boiler system 302. Each boiler 306 may correspond to a heat source 102, 802. Flue gas 314, which may be a first heated process fluid 108, exits each boiler 306 and passes to a stack 308, where it is vented from the boiler plant. A heat scavenger 316 may be placed within each boiler system 302, and each heat scavenger 316 may correspond to a heat scavenger 202 of FIG. 1 or a heat scavenger 902 of FIG. 2. Each heat scavenger 316 receives and removes heat from flue gas 314, and provides the removed heat to system fluid, such as a first portion of system fluid 220, to create cooled flue gas 318, which may correspond to cooled plant fluid 110.

Anywhere there is plant fluid in the boiler plant 100, 200 that needs to be heated, a heat sink of a thermal efficiency system of the present technology can be provided. FIGS. 4 and 5 illustrate examples of heat sinks of a thermal efficiency system of the present technology that can be used to provide heat to various plant fluids, including process fluids and service fluids.

FIG. 4 illustrates a heat sink 400 placed to provide heat to process fluid 402 coming from a process fluid source 404. Process fluids may be any fluid used within the industrial process of the boiler plant 100, 200, such as, for example, process water, combustion air, make up water, condensate return water, other heat transfer fluids, and glycol-water mixtures. The process fluid 402 can be provided from the process fluid source 404 into the heat sink 400. The heat sink 400 receives and removes heat from heated system fluid, such as at least one second portion of heated system fluid 224, and provides the removed amount of heat into process fluid 402 to create heated process fluid 404, which may correspond to a second heated plant fluid 114.

FIG. 5 illustrates a first heat sink 500 and a second heat sink 502 that are both placed to provide heat to service fluids associated with boiler plant 100, 200. Process fluids may be any fluid used for building service needs within the boiler plant 100, such as, for example, building make up air, other heat transfer fluids and glycol-water mixtures, and service water. The first heat sink 500 is configured to receive first service fluid 504, which may be, for example, make up air. The second heat sink 502 is configured to receive second service fluid 506, which may be, for example, service water. The first service fluid 504 can be provided into the first heat sink 500, and the second service fluid 506 can be provided into the second heat sink 500. The first heat sink 500 receives and removes heat from heated system fluid, such as at least one second portion of heated system fluid 224, and provides the removed amount of heat into first service fluid 504 to create heated first service fluid 508, which may correspond to a second heated plant fluid 114. The second heat sink 502 receives and removes heat from heated system fluid, such as at least one second portion of heated system fluid 224, and provides the removed amount of heat into second service fluid 506 to create heated second service fluid 510, which may correspond to a second heated plant fluid 114.

Referring back to FIG. 1, the control system 208 can include a controller 234, a plurality of sensors, and a plurality of valves. Likewise, referring to FIG. 2, the control system 908 and controller 934 can include the same structural components as control system 208 and controller 234. The primary difference between control system 208 and 908 being the method of operation with respect to the direction of the system fluid flow. It should therefore be understood that, the examples discussed below with respect to control system 208 and controller 234 are equally applicable to the control system 908 and controller 934.

The plurality of sensors are configured to sense a plurality of parameters and to provide a plurality of first signals regarding the sensed parameters to the controller 234. The plurality of sensors can include an ambient temperature sensor 236 that measures ambient temperature, and/or an ambient humidity sensor 238 that measures ambient humidity. Other examples of sensors that can be included in the plurality of sensors are: a system fluid temperature sensor 240 that measures the temperature of system fluid 210 or the first portion of system fluid 220 from the reservoir 206 through the reservoir outlet 232; a system fluid flow meter 242 that measures the flow rate of the first portion of system fluid 220 from the reservoir 206 through the reservoir outlet 232; a cooled plant fluid temperature sensor 244 that measures the temperature of a cooled plant fluid 110 that exits a heat scavenger 202; a heated plant fluid temperature sensor 246 that measures the temperature of a heated plant fluid 114 that exits a heat sink 204; and a cooled system fluid temperature sensor 248 that measures a temperature of the second portions of cooled system fluid 228 that are returned to the reservoir 206. In some examples, the plurality of sensors can include two or more of the following sensors: an ambient temperature sensor 236, an ambient humidity sensor 238, a system fluid temperature sensor 240, a system fluid flow meter 242, a cooled plant fluid temperature sensor 244, a heated plant fluid temperature sensor 246, and a cooled system fluid 228 temperature sensor 248. In some examples, the plurality of sensors includes at least an ambient temperature sensor 236, an ambient humidity sensor 238, a system fluid temperature sensor 240, and a system fluid flow meter 242. The plurality of sensors can include a plurality of cooled plant fluid temperature sensors 244, which can include at least one cooled plant fluid temperature sensor 244 that measures the temperature of the cooled plant fluid 110 that exits each heat scavenger 202. The plurality of sensors can include a plurality of heated plant fluid temperature sensors 246, which can include at least one heated plant fluid temperature sensor 246 that measures the temperature of the heated plant fluid 114 exits each heat sink 204.

The plurality of valves can include one or more scavenger inlet valves 250 and one or more heat sink inlet valves 252. The plurality of valves can include a scavenger inlet valve 250 operatively connected to the scavenger inlet 254 of each heat scavenger 202. Each scavenger inlet valve 250 can be configured to provide at least one first portion of system fluid 220 into the heat scavenger 202 to which it is operatively connected through the scavenger inlet 254. The plurality of valves can also include a heat sink inlet valve 252 operatively connected to the heat sink inlet 256 of each heat sink 204. Each heat sink inlet valve 252 can be configured to provide at least one second portion of heated system fluid 224 into the heat sink 202 to which it is operatively connected through the heat sink inlet 256. Each of the plurality of valves is configured to be selectively activated by the controller 234. Each scavenger inlet valve 250 can be selectively activated, such as being opened or closed, to control the amount of excess heat extracted by the heat scavenger 202 to which it is operatively connected. Similarly, each heat sink inlet valve 252 can be selectively activated, such as by being opened or closed, to control the amount of stored excess heat delivered to the heat sink to which it is operatively connected.

The controller 234 may include one or more programmable logic controllers. The controller 234 includes at least one processor 260 and at least one memory device 262. Among other things, one or more memory devices 262 can store software, applications, or computer instructions in accordance with which one or more of the processing devices 260 operate. For example, the at least one memory may store thermal efficiency system control instructions that, when executed by the at least one processor, cause the controller 234 to control the thermal efficiency system 200.

It should be appreciated that the controller 234 can take any of variety of forms depending upon the embodiment, and can include or encompass one or more processors 260 and one or more memory devices 262, as well as one or more input/output (I/O) devices and/or user interfaces. The one or more processors can take any of a variety of forms depending upon the embodiment, and can include any of a variety of one or more systems, components, or devices that perform any of a variety of types of processing or calculation operations. For example, depending upon the embodiment, the one or more processors can respectively be implemented by way of respective hardware devices or components, firmware, or software implemented upon hardware encompassed by the one or more processors. Also for example, the one or more processors can be or include one or more microprocessors, one or more microcomputers, or one or more other forms of processing devices such as programmable logic devices (PLDs) or application specific integrated circuits (ASICs).

Likewise, one or more memory devices 262 can take any of a variety of forms depending upon the embodiment. For example, in some embodiments, one or more of the memory devices 262 can be a non-volatile memory. One or more of the memory devices 262 may employ any of magnetic disk storage, optical disk storage, random access memory (RAM) devices, read only memory (ROM) devices, compact disc read only memory (CD/ROM) devices, electrically erasable programmable read only memory (EEPROM) devices, or other forms of storage devices or computer-readable storage media. In some embodiments, the processing and memory functionality of the controller 234 can be performed at least in part by way of a single device that includes both processing and memory capabilities (e.g., a processor-in-memory or PIM) and, in such embodiments, such a device can be considered to be both one of the processors 260 and one of the memory devices 262.

The thermal efficiency system 200 includes one or more communication links 258, and each of the plurality of sensors and the plurality of valves may be operatively connected to the controller 234 via at least one communication link 258. The one or more communication links 258 are intended to be representative of, depending upon the embodiment, any of a variety of different types or combinations of communication media or links. Among other things, the communication media or links that can be employed in various embodiments can include any of a variety of wired or wireless communication media or links involving electrical cables, coaxial cables, fiber optics or other optical communications media or technologies, digital subscriber lines (DSL), cellular technologies (e.g., 3G, 4G, LTE, or 5G), Bluetooth communications, Wi-Fi communications, radio wave, infrared, microwave, Local Area Network (LAN), or other wireless or wired communications technologies.

Figure 6:
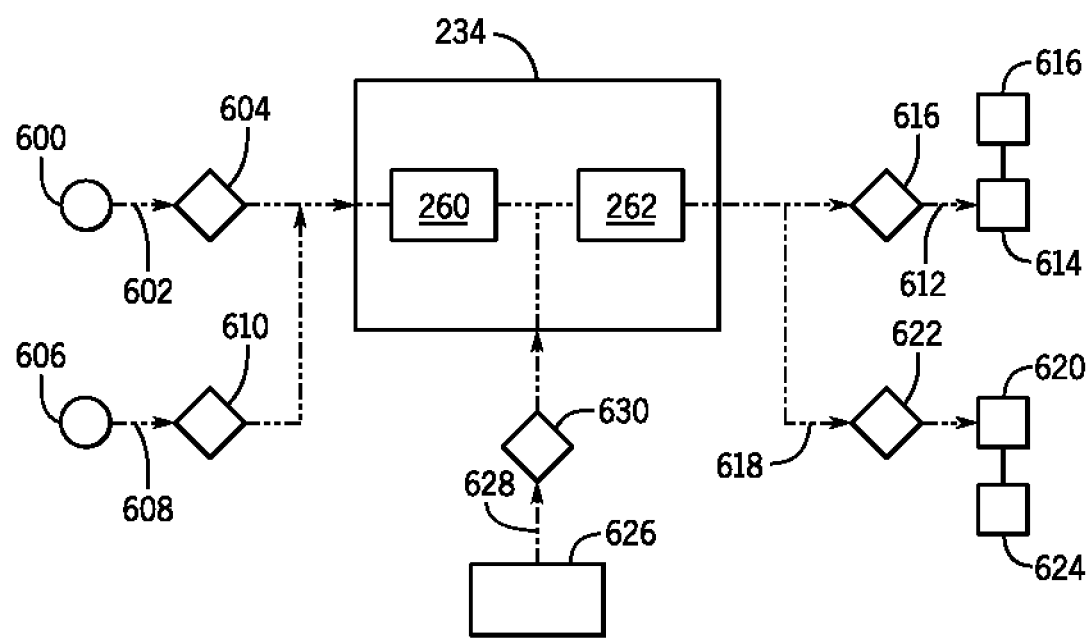
FIG. 6 illustrates one example of a controller of the system of FIG. 1, with two sensors, a heat scavenger, a heat sink, and a user interface.

Referring to FIG. 6, the controller 234 is configured to perform monitoring and control of the thermal efficiency system 200, 900, at least by way of plurality of sensors and the plurality of control valves.

Each sensor of the plurality of sensors senses at least one parameter, such as temperature or flow rate, and provides a sensed parameter signal containing information about the at least one sensed parameter to the controller 234. For example, a first sensor 600 can sense a first parameter and provide a first sensed parameter signal 602, which contains information about the first sensed parameter, to the controller 234 via a first communication link 604. In at least one example, the first sensor 600 may be an ambient temperature sensor or an ambient humidity sensor and the first parameter may be ambient temperature or ambient humidity, respectively. A second sensor 606 can sense a second parameter and provide a second sensed parameter signal 608, which contains information about the second sensed parameter, to the controller 234 via a second communication link 610. In at least one example, the second sensor 606 may be a system fluid temperature sensor or a system fluid flow meter, and the second parameter may be system fluid temperature or system fluid flow rate, respectively. The controller 234 receives the first sensed parameter signal 602 from the first sensor 600, and the second sensed parameter signal 608 from the second sensor 606. Indeed, the controller 234 may receive at least one sensed parameter signal from each of the plurality of sensors.

The controller 234 generates and sends at least one control signal to selectively activate one or more of the plurality of valves to control the amount of excess heat extracted by each of the plurality of heat scavengers and direct each second portion of heated system fluid to a heat sink. The controller 234 may generate the at least one control signal based in part on the sensed parameter signals received from the plurality of sensors. The controller 234 may send a first control signal 612 to a first scavenger inlet valve 614 via a third communication link 616 to selectively activate, such as by opening or closing, the first scavenger inlet valve 614, which may thereby control the amount of excess heat extracted by the first heat scavenger 616. For example, referring to FIGS. 1 and 6, the first control signal 612 may selectively activate first scavenger inlet valve 614 to direct a first portion of system fluid 220 to first heat scavenger 616. The first heat scavenger 616 may extract an amount of excess heat from a first portion of heated plant fluid 108, and provide the extracted amount of heat into the first portion of system fluid 220 to create a first portion of heated system fluid 222. The controller 234 may send a second control signal 618 to a first heat sink inlet valve 620 via a fourth communication link 622 to selectively activate, such as by opening or closing, the first heat sink inlet valve 620, which may thereby direct at least one second portion of heated system fluid (e.g., second portion of heated system fluid 224 shown in FIG. 1) to a first heat sink 624 and control the amount of heat provided to the first heat sink 624. For example, the second control signal 618 may selectively activate first heat sink inlet valve 620 to direct a second portion of heated system fluid 224 to a first heat sink 624. The heat sink 624 may receive and remove an amount heat from the second portion of heated system fluid 224 to create a first portion of cooled system fluid 226.

The thermal efficiency systems 200 of FIG. 1 and 900 of FIG. 2 may also include at least one user interface 626 that may be configured to engage in communications with the controller 234 via a fifth communication link 630. Depending upon the embodiment, the at least one user interface 626 can take the form of a computer (or computer system or device) and can include, for example, a personal computer such as laptop or notebook computer, a mobile device such as a smart phone, cellular telephone, hand held device or handset, or another mobile computing device. The at least one user interface 626 is also intended to be representative of any of a variety of input/output (I/O) devices that permit signals or information to be input to the controller 234 or output from the controller 234. Such I/O devices can for example include devices such as video displays or monitors, touch screens, keyboards, mouse devices, and speakers, as well as wireless transceivers or Wi-Fi hotspots that facilitate wireless communications.

A user may use the at least one user interface 626 to send at least one input data signal 628 to the controller 234. The at least one input data signal 626 may include at least one set points providing a temperature limit for at least one plant fluid. For example, referring to FIGS. 1 and 3, the cooled plant fluid temperature sensor 244 measures the temperature of a cooled plant fluid 110 that exits a heat scavenger 202. One example of a cooled plant fluid 110 is cooled flue gas 318. A first set point may be a lower temperature limit for the cooled flue gas 318. Other set points that may be entered by a user and included in the at least one input data signal 262 may include a lower temperature limit for any cooled plant fluid 110. As another example, referring to FIGS. 1 and 3, the heated plant fluid temperature sensor 246 measures the temperature of a heated plant fluid 114 that exits a heat sink 204. One example of a heated plant fluid 114 is heated combustion air 312. A second set point may be a lower temperature limit or an upper temperature limit for the heated combustion air 312. Other set points that may be entered by a user and included in the at least one input data signal 262 may include a lower temperature limit or a lower temperature limit for any heated plant fluid 114. The controller receives the input data signal 628 from the at least one user interface 626, and generates the at least one control signal based in part on the one or more set points.

Accordingly, the controller 234 may generate the at least one control signal based in part on both the sensed parameter signals received from the plurality of sensors and the one or more set points received from the user interface. Referring to FIG. 1, in examples where the plurality of sensors includes an ambient temperature sensor 236 and/or an ambient humidity sensor 238, the controller 234 can monitor ambient conditions and manage fluid flow through each heat scavenger 202 and each heat sink 204 to maintain the temperatures of the plant fluids in accordance with the one or more set points. Referring to FIGS. 3 and 6, the controller 234 may also be capable of calculating acid dew points, and may generate the at least one control signal based in part on a calculated acid dew point to ensure that cooled flue gas 318 is maintained at a temperature above dew point when a stack 308 is operating in a non-condensing mode.

Figure 7:
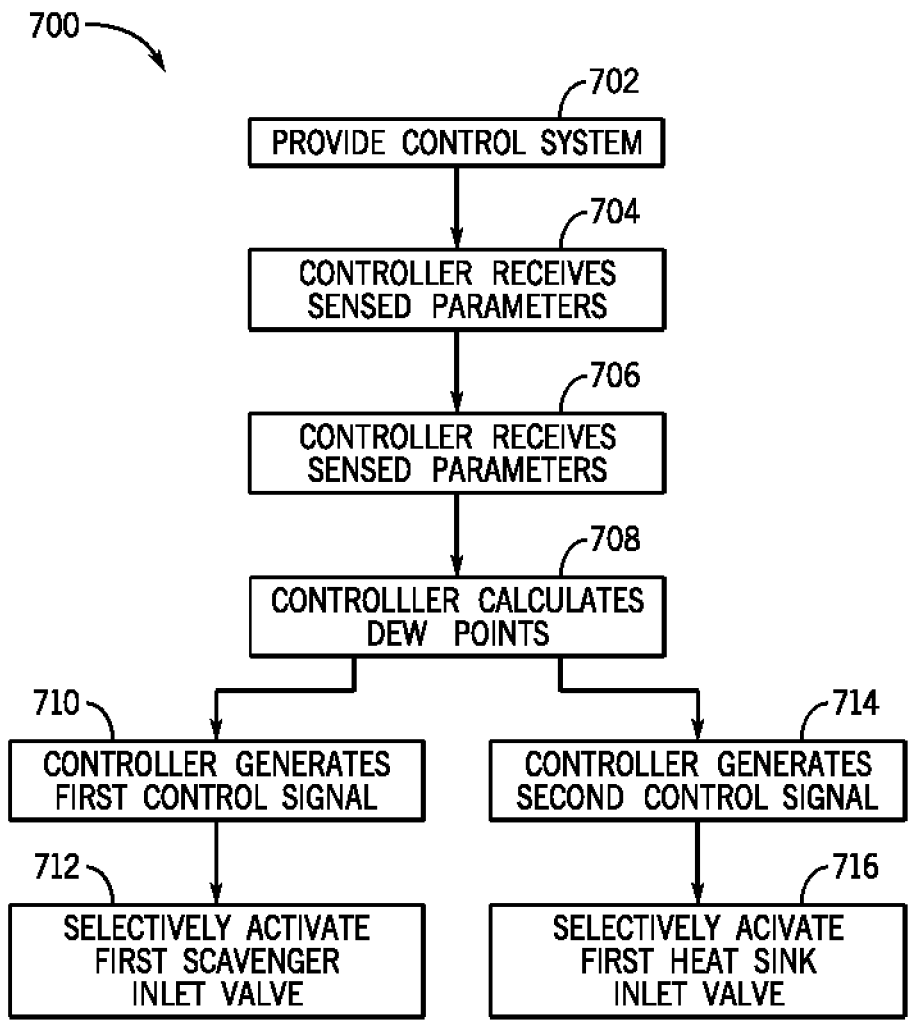
FIG. 7 illustrates a flow chart for one method of operating a thermal efficiency system of FIG. 1.

FIG. 7 illustrates one example of a method of operating a thermal efficiency system such as thermal efficiency system 200 as shown in FIGS. 1 and 3-6.

The method starts at step 702, with providing a control system such as control system 208, which includes a controller 234, a plurality of sensors, and a plurality of valves.

The method 700 can progress to step 704, where the controller 234 receives at least one sensed parameter signal from at least one of the plurality of sensors, such as first sensed parameter signal 602 from the first sensor 600. In step 704, the controller may also receive additional sensed parameter signals from any of the sensors, such as second sensed parameter signal 608 from the second sensor 606. As discussed above, the first sensor 600 may be an ambient temperature sensor 236 or an ambient humidity sensor 238.

The method 700 also includes step 706, where the controller receives a data input signal from a user interface, such as data input signal 628. The data input signal may include at least one set point providing a temperature limit for at least one plant fluid. In at least one example, the at least one set point may include a lower temperature limit for a cooled plant fluid, such as cooled flue gas 318. The at least one set point may also include is a lower temperature limit or an upper temperature limit for a heated plant fluid. It should be understood that steps 704 and 706 are not necessarily performed in the order shown, and that step 706 may be performed before step 704. For example, step 706 may be performed as part of the set-up of the thermal efficiency system, while step 704 may be performed during operation of the thermal efficiency system after set-up. Step 706 may also be performed any time a user wants to adjust or alter any set point, whether during set-up or operation of the thermal efficiency system.

When the controller has received at least one sensed parameter in step 704 and at least one set point in step 706, the method 700 may progress to step 710, where the controller generates at least a first control signal, such as first control signal 612, based at least in part on the at least one sensed parameter signal and the at least one set point. In at least one example, prior to progressing to step 710, the method may include step 708, where the controller calculates an acid dew point. The controller may calculate the acid dew point based at least in part on ambient temperature and/or humidity conditions that may be included in the at least one sensed parameter. In methods that include step 708, step 710 may include the controller generating the first control signal further based at least in part on the calculated acid dew point.

Once a first control signal is generated at step 710, the method 700 may progress to step 712, where the first control signal selectively activates a first scavenger inlet valve, such as first scavenger inlet valve 614, to direct a first portion of system fluid 220 to a first heat scavenger 202, 616. The first heat scavenger 202, 616 may extract an amount of excess heat from a first portion of heated plant fluid 108, and provide the extracted amount of heat into the first portion of system fluid 220 to create a first portion of heated system fluid 222.

The method 700 may also include a step 714, where the controller 234 generates at least a second control signal, such as second control signal 618, which may be based at least in part on the at least one sensed parameter signal and the at least one set point. The method may further include step 716, where the second control signal selectively activates a first heat sink inlet valve, such as first heat sink inlet valve 620, to direct a second portion of heated system fluid 224 to a first heat sink 204, 624. By selectively activating the valves in steps 712 and 716, the controller 234 may control the amount of excess heat extracted by each of the plurality of heat scavengers and direct each second portion of heated system fluid to a heat sink.

Figure 8:
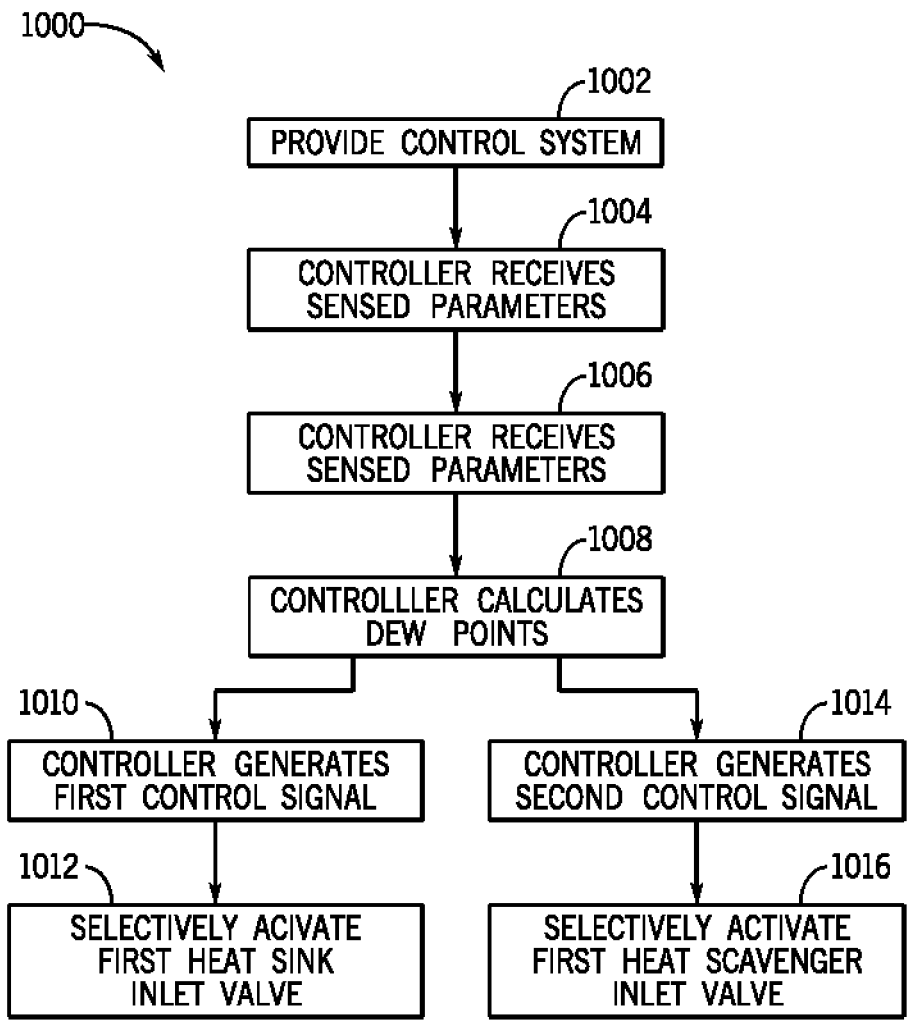
FIG. 8 illustrates a flow chart for one method of operating a thermal efficiency system of FIG. 2.

FIG. 8 illustrates one example of a method 1000 of operating a thermal efficiency system such as thermal efficiency system 900 as shown in FIG. 2.

The method starts at step 1002, with providing a control system such as control system 908, which includes a controller 934, a plurality of sensors, and a plurality of valves.

The method 1000 can progress to step 1004, where the controller 934 receives at least one sensed parameter signal from at least one of the plurality of sensors, such as first sensed parameter signal 602 from the first sensor 600. In step 1004, the controller may also receive additional sensed parameter signals from any of the sensors, such as second sensed parameter signal 608 from the second sensor 606. The first sensor 600 may be an ambient temperature sensor 936 or an ambient humidity sensor 938.

The method 1000 also includes step 1006, where the controller receives a data input signal from a user interface, such as data input signal 628. The data input signal may include at least one set point providing a temperature limit for at least one plant fluid. In at least one example, the at least one set point may include a lower temperature limit for a cooled plant fluid, such as cooled flue gas 318. The at least one set point may also include is a lower temperature limit or an upper temperature limit for a heated plant fluid. It should be understood that steps 1004 and 1006 are not necessarily performed in the order shown, and that step 1006 may be performed before step 1004. For example, step 1006 may be performed as part of the set-up of the thermal efficiency system, while step 1004 may be performed during operation of the thermal efficiency system after set-up. Step 1006 may also be performed any time a user wants to adjust or alter any set point, whether during set-up or operation of the thermal efficiency system.

When the controller has received at least one sensed parameter in step 1004 and at least one set point in step 1006, the method 1000 may progress to step 1010, where the controller generates at least a first control signal based at least in part on the at least one sensed parameter signal and the at least one set point.

Once a first control signal is generated at step 1010, the method 1000 may progress to step 1012, where the first control signal selectively activates a first heat sink inlet valve to direct a first portion of heated system fluid to a first heat sink. The first heat sink may extract an amount of excess heat from the first portion of heated system, and provide the extracted amount of heat into a first portion of plant fluid to create a first portion of cooled system fluid.

The method 1000 may also include a step 1014, where the controller 934 generates at least a second control signal which may be based at least in part on the at least one sensed parameter signal and the at least one set point. In at least one example, prior to progressing to step 1014, the method may include step 1008, where the controller calculates an acid dew point. The controller may calculate the acid dew point based at least in part on ambient temperature and/or humidity conditions that may be included in the at least one sensed parameter. In methods that include step 1008, step 1014 may include the controller generating the second control signal further based at least in part on the calculated acid dew point. The method may further include step 1016, where the second control signal selectively activates a first heat scavenger inlet valve to direct a second portion of cooled system fluid to a first heat scavenger 904. By selectively activating the valves in steps 1012 and 1016, the controller 934 may control the flow of system fluid to each heat sink and each heat scavenger.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A thermal efficiency system in a boiler plant, the system comprising:
   a reservoir that stores system fluid, the reservoir having an inlet and an outlet;
   a plurality of heat sinks, wherein each heat sink is configured to receive and remove an amount of heat from a first portion of heated system fluid to create a first portion of cooled system fluid;
   a plurality of heat scavengers, wherein each heat scavenger is configured to receive a second portion of cooled system fluid, extract an amount of excess heat from a portion of heated plant fluid, and provide the extracted amount of heat into the second portion of cooled system fluid to create a second portion of heated system fluid; and
   a control system including a controller, a plurality of sensors, and a plurality of valves;
   wherein the controller receives at least one sensed parameter signal from at least one of the plurality of sensors, and sends at least one control signal to selectively activate one or more of the plurality of valves to control flow of the system fluid.

2. The thermal efficiency system of claim 1, further comprising a piping system that conveys each first portion of heated system fluid to each heat sink, combines one or more of the first portions of cooled system fluid to create each second portion of cooled system fluid, conveys each second portion of cooled system fluid to a heat scavenger, and conveys the at least one second portion of heated system fluid to the reservoir inlet.

3. The thermal efficiency system of claim 1, wherein the system fluid is deaerated water.

4. The thermal efficiency system of claim 1, wherein the plant fluid is a service fluid.

5. The thermal efficiency system of claim 1, wherein the plurality of heat sinks comprises at least a first heat sink that provides the amount of removed heat to a process fluid, and at least a second heat sink that provides the amount of removed heat to a system fluid.

6. The thermal efficiency system of claim 1, wherein the plurality of sensors comprises at least two or more sensors selected form the group consisting of: an ambient temperature sensor, an ambient humidity sensor, a system fluid temperature sensor, a system fluid flow meter, a cooled plant fluid temperature sensor, a heated plant fluid temperature sensor, and a cooled system fluid temperature sensor.

7. The thermal efficiency system of claim 6, wherein the plurality of sensors comprises an ambient temperature sensor, an ambient humidity sensor, a system fluid temperature sensor, and a system fluid flow meter.

8. The thermal efficiency system of claim 1, wherein the plurality of sensors comprises at least one cooled plant fluid temperature sensor that measures a temperature of cooled plant fluid from each heat scavenger.

9. The thermal efficiency system of claim 1, wherein the plurality of sensors comprises at least one heated plant fluid temperature sensor that measures a temperature of heated plant fluid from each heat sink.

10. The thermal efficiency system of claim 1, further comprising at least one user interface that sends an input data signal to the controller, wherein the input data signal includes at least one set point providing a temperature limit for at least one plant fluid, and the controller generates the at least one control signal based in part on the at least one set point.

11. The thermal efficiency system of claim 10, wherein the at least one set point is a lower temperature limit for a cooled plant fluid.

12. The thermal efficiency system of claim 10, wherein the at least one set point is a lower temperature limit or an upper temperature limit for a heated plant fluid.

13. The thermal efficiency system of claim 1, wherein the controller sends a first control signal to a first scavenger inlet valve to selectively open or close the first scavenger inlet valve and a second control signal to a first heat sink inlet valve to selectively open or close the first heat sink inlet valve.

14. A thermal efficiency system in a boiler plant, the system comprising:
   a reservoir that stores system fluid, the reservoir having an inlet and an outlet;
   a plurality of heat scavengers, wherein each heat scavenger is configured to receive a first portion of system fluid from the reservoir outlet, extract an amount of excess heat from a first portion of heated plant fluid, and provide the extracted amount of heat into the first portion of system fluid to create a first portion of heated system fluid;
   a plurality of heat sinks, wherein each heat sink is configured to receive and remove an amount of heat from a second portion of heated system fluid to create a first portion of cooled system fluid; and
   a control system including a controller, a plurality of sensors, and a plurality of valves;
   wherein the controller receives at least one sensed parameter signal from at least one of the plurality of sensors, and sends at least one control signal to selectively activate one or more of the plurality of valves to control the amount of excess heat extracted by each of the plurality of heat scavengers and direct each second portion of heated system fluid to a heat sink.

15. The thermal efficiency system of claim 14, further comprising a piping system that conveys each first portion of system fluid to each heat scavenger, combines one or more of the first portions of heated system fluid to create each second portion of heated system fluid, conveys each second portion of heated system fluid to a heat sink, combines one or more of the first portions of cooled system fluid to create at least one second portion of cooled system fluid, and conveys the at least one second portion of cooled system fluid to the reservoir inlet.

16. A method of operating a thermal efficiency system in a boiler plant, the system comprising steps of:
   providing a control system including a controller, a plurality of sensors, and a plurality of valves;
   receiving by the controller at least one sensed parameter signal from at least one of the plurality of sensors;
   receiving by the controller a data input signal from a user interface, the data input signal including at least one set point providing a temperature limit for at least one plant fluid;

generating by the controller at least a first control signal based at least in part on the at least one sensed parameter signal and the at least one set point;

selectively activating by the first control signal a first scavenger inlet valve to direct a first portion of system fluid to a first heat scavenger, wherein the heat scavenger extracts an amount of excess heat from a first portion of heated plant fluid, and provides the extracted amount of heat into the first portion of system fluid to create a first portion of heated system fluid.

17. The method of claim 16, further comprising steps of:
generating by the controller at least a second control signal based at least in part on the at least one sensed parameter signal and the at least one set point; and
selectively activating by the second control signal a first heat sink inlet valve to direct a second portion of heated system fluid to a first heat sink.

18. The method of claim 16, further comprising a step of:
calculating by the controller an acid dew point;
wherein the step of generating by the controller at least a first control signal is further based at least in part on the calculated acid dew point.

19. A method of operating a thermal efficiency system in a boiler plant, the system comprising steps of:

providing a control system including a controller, a plurality of sensors, and a plurality of valves;

receiving by the controller at least one sensed parameter signal from at least one of the plurality of sensors;

receiving by the controller a data input signal from a user interface, the data input signal including at least one set point providing a temperature limit for at least one plant fluid;

generating by the controller at least a first control signal based at least in part on the at least one sensed parameter signal and the at least one set point;

selectively activating by the first control signal a first heat sink inlet valve to direct a first portion of heated system fluid to a first heat sink, wherein the heat sink extracts heat from the first portion of heated system fluid to create a first portion of cooled system fluid.

20. The method of claim 19, further comprising steps of:
generating by the controller at least a second control signal based at least in part on the at least one sensed parameter signal and the at least one set point; and
selectively activating by the second control signal a first heat scavenger inlet valve to direct a second portion of cooled system fluid to a first heat scavenger.

* * * * *